A. SMITH.
PULLEY BLOCK.
APPLICATION FILED MAY 4, 1909.
969,989.  Patented Sept. 13, 1910.
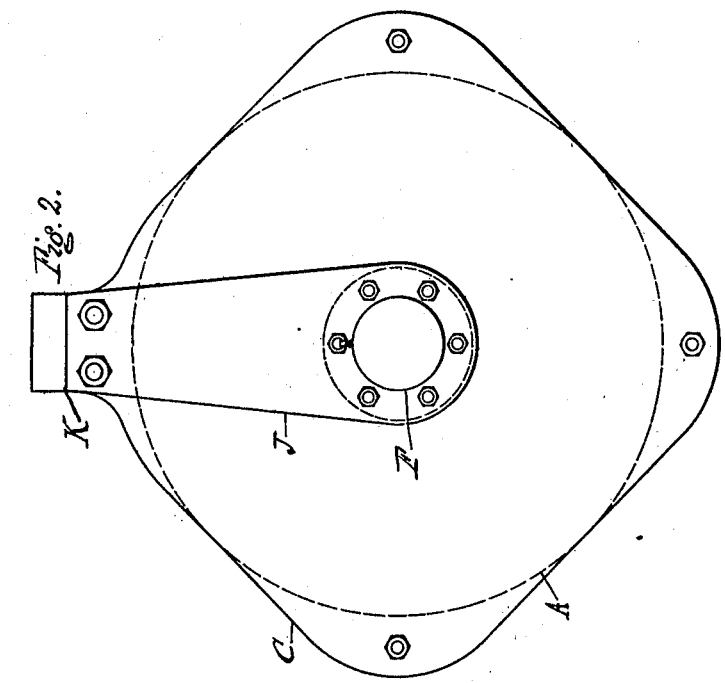
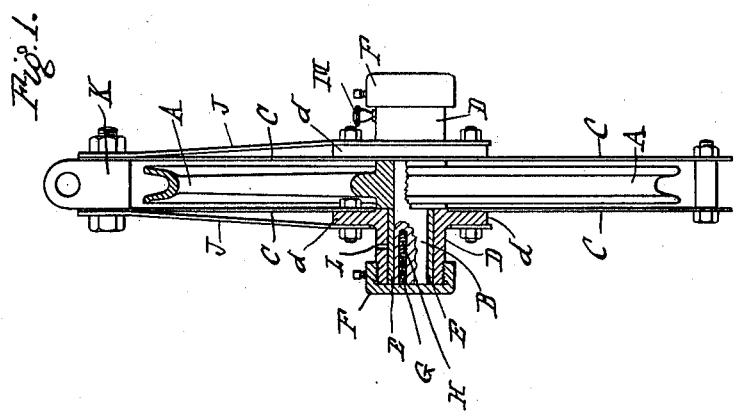

UNITED STATES PATENT OFFICE.

AUGUSTUS SMITH, OF NORTH PLAINFIELD, NEW JERSEY, ASSIGNOR TO BERGEN POINT IRON WORKS, OF NEW YORK, N. Y., A CORPORATION OF NEW JERSEY.

PULLEY-BLOCK.

969,989.  Specification of Letters Patent.  Patented Sept. 13, 1910.

Application filed May 4, 1909. Serial No. 493,844.

*To all whom it may concern:*

Be it known that I, AUGUSTUS SMITH, a citizen of the United States of America, residing in the city of North Plainfield, in the county of Union and State of New Jersey, have invented an Improved Pulley-Block, of which the following is a specification.

The main object of my invention is to so construct the sheaves and mount them in pulley blocks as to secure better lubrication, and the provision of increased journal surface so that heavy loads can be carried by the sheave without increasing the pressure on the journal beyond the limits that are necessary to insure proper lubrication and prevent undue wear.

Another object of my invention is to so arrange the mounting of the sheave that the wear does not increase progressively with continued use, but will increase no faster after the sheave has been in use for some time than it does at the start.

A further object of my invention is to so arrange the mounting of the sheave that it is adequately supported in the plane of rotation, a thing which is not possible with a sheave running loose on an axle in the usual way where the length of the journal is necessarily not much greater than the distance between the side plates of the block.

Many of the advantages above noted are common to the customary mounting of a wheel on an axle which turns with it in fixed bearings as opposed to the mounting of a loose wheel on a fixed axle. The novelty of my invention consists in applying the above principle to a sheave wheel in a pulley block and designing the component parts so as to adapt them to this service.

In the accompanying drawings Figure 1 is a transverse vertical section taken through a sheave wheel in a pulley block; Fig. 2 is a side elevation of the same.

A is the sheave wheel scored usually for wire rope; B is the shaft or axle which is forced tightly into the sheave so as to turn with it; C, C are the side plates or cheek plates of the pulley block; D, D are journals usually made of cast iron; and E, E are suitable anti-friction bearings fitted into the journals D. These bearings reduce the friction on the shaft and can be removed and renewed when worn out.

F, F are solid caps usually screwed on to the journals D to close the bearing against the entrance of dirt.

G, G are grease cartridges which are forced outward by springs H against the screw caps F. The grease, therefore, is worn off by friction against the cap F as the axle turns and is carried out through the journal, effecting complete lubrication. The screw cap F can be readily removed to put in new grease cartridges, or to renew the journal bearings; the length and diameter of the bearing surface of the axle in the journal can be made to suit the load carried by the sheave and are quite independent of the distance between the cheek plates C, C.

The sheave is held rigidly in the plane of rotation by virtue of the long shaft or axle B. Heavy hanger straps J, J reinforce the cheek plates $C^1$ and transmit the load directly from the journal castings to the pin K, by which the pulley block is supported from some point above. If the pulley were hung in the bight of the hoisting rope a hook or link depending from the pin K would lift the load. In either case the function of the hanger straps J, J, would be the same. The cheek plates are secured to the inner faces of the flanges $d$ of the journals D, while the hanger straps J are secured to the outer faces of said flanges.

The journals may be lubricated through an oil hole as at L, or from an oil reservoir as at M, in addition to or instead of by the grease cartridges G.

I claim as my invention

In a pulley block, an axle and sheave wheel mounted on the axle to turn with it, in combination with the cheek plates and hanger straps of the block, journals having flanges to the inner faces of which are fixed said cheek plates, while to the outer faces of the flanges are fixed the hanger straps.

In testimony whereof I have signed my name to this specification, in the presence of two subscribing witnesses.

AUGUSTUS SMITH.

Witnesses:
 HUBERT HOWSON,
 WALTER ABBE.